INVENTORS.
ALEXANDER H. MARK &
HUNTER DAVID JAMISON
BY Wolfe, Hubbard, Voit & Osann
ATTORNEYS.

INVENTORS.
ALEXANDER H. MARK &
HUNTER DAVID JAMISON
BY Wolfe, Hubbard, Voit & Osann
ATTORNEYS.

United States Patent Office 3,065,643
Patented Nov. 27, 1962

3,065,643
SPLIT-PATH TORQUE CONVERTER TRANSMISSION AND POWER TAKE-OFF DRIVE
Alexander Hing Mark, Livonia, and Hunter David Jamison, Inkster, Mich., assignors to Massey-Ferguson, Inc., Detroit, Mich., a corporation of Maryland
Filed Apr. 5, 1961, Ser. No. 100,925
3 Claims. (Cl. 74—15.63)

Torque converters have been conventionally employed in transmissions to provide smooth application of torque to vehicular drive wheels. By allowing slippage, torque converters assure that the vehicle is not jerked into movement at the start, and also provide a smooth match of engine torque output to varying torque requirements of a varying load on the drive wheels. Because of these characteristics, the use of a converter in an agricultural tractor transmission has long interested the industry.

However, because a certain size torque converter can handle only a definite torque and no more at a given speed and since tractor transmissions must be operated at low speeds to power the tractor and its implements over rough terrain, a problem arises in fitting the required capacity torque converter into a practical sized transmission housing.

Further, it has been a problem to achieve the advantages derived from the smooth operation of a torque converter in farm tractor transmissions without forfeiting "live" p.t.o. operation. That is, a p.t.o. which operates constantly whenever the engine is driven regardless of whether the power is applied to the drive wheels.

Accordingly, it is an object of this invention to provide a transmission for a tractor which smoothly transfer power to the drive wheels and is adapted to fit within conventional tractor transmission housings.

It is a further object to provide a transmission of the above character which has a constant positive drive for a live p.t.o.

It is accordingly a further object to provide a torque converter tractor transmission of the above type which is easily serviced and of rugged construction for long life.

Figure 1:
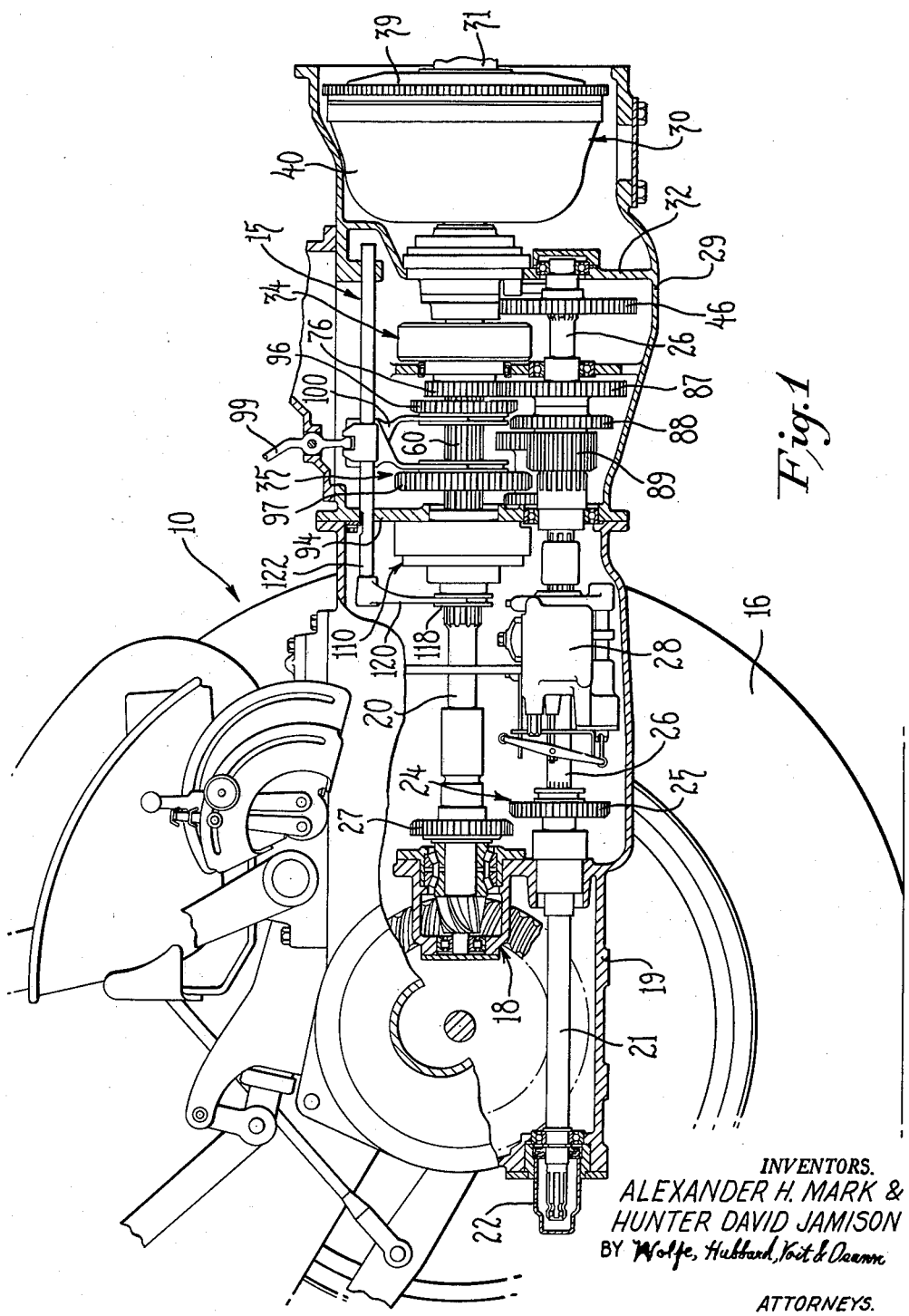
Figure 2:
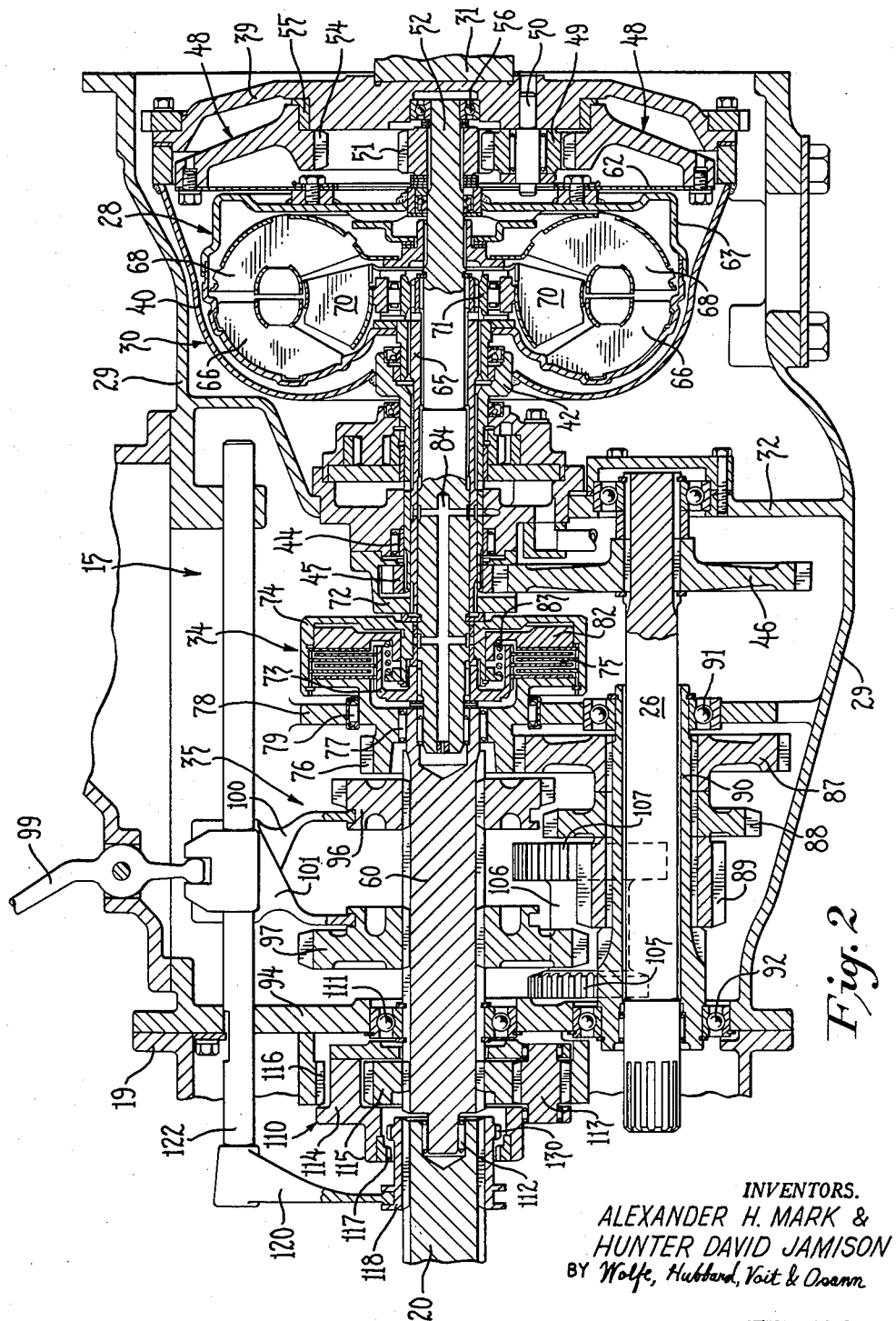

Other objects and advantages of the invention will become apparent upon reading the following detailed description and upon reference to the drawings in which:

FIGURE 1 is a fragmentary longitudinal section of a tractor embodying a transmission constructed in accordance with the present invention; and FIG. 2 is an enlarged fragmentary section of the transmission shown in FIG. 1.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Turning to the drawings, there is shown in FIG. 1 a fragmentary longitudinal section of a tractor 10 having a transmission 15 embodying the present invention. The tractor includes rear drive wheels, of which only the wheel 16 is shown, that are driven by a differential 18 of conventional ring gear and pinion type housed within a differential casing 19. The differential 18 is powered by a drive shaft 20 which extends rearwardly from the transmission 15 and defines the output element of the transmission.

Also enclosed in the casing 19 is a p.t.o. shaft 21 which extends rearwardly from the casing to power equipment mounted on or drawn by the tractor 10. For protective purposes, the rear end of the shaft is enclosed by a removable cover 22.

The p.t.o. shaft 21 is driven by either a constantly rotated or "live" p.t.o. driving shaft 26 or the transmission output shaft 20 through a clutch and gear assembly 24 mounted between the shaft 21 and the drive shaft 26. The assembly 24 includes a sliding gear and clutch element 25 which can be shifted to any one of three positions. When shifted to the left in FIG. 1, the gear 25 meshes with a gear 27 on the drive shaft 20 so that the p.t.o. shaft 21 is driven from the drive shaft 20 at a speed proportional to the ground speed of the tractor. Shifting the gear and clutch element 25 to the right and clear of the gear 27 couples the p.t.o. shaft 21 to the drive shaft 26 so that the p.t.o. shaft 21 is driven at a speed proportional to the speed of the tractor engine. Further shifting movement of the gear and clutch element 25 to the right in FIG. 1 breaks the connection between the drive shaft 26 and the p.t.o. shaft 21 so that a neutral or disengaged condition is obtained. For a more complete explanation of this structure, reference may be had to U.S. Patent No. 2,817,408, issued December 24, 1957, to Klemm.

For providing a source of hydraulic pressure for operating the tractor hydraulic equipment, a pump 28 is floatingly mounted on the shaft 26 and powered by the constantly rotated p.t.o. drive shaft 26. For details of such a pump construction, reference may again be had to the Klemm patent referred to above.

The transmission 15 is enclosed within a casing 29 whose open front end is secured to the tractor power source or engine, of which only the end of crankshaft 31 is shown. The rear of the casing 29 is secured by cap screws to the differential casing 19. Thus, the casing 29, together with the engine and the differential casing 19, forms the frame or chassis of the tractor 10.

In accordance with the present invention, the transmission 15 includes a torque converter and planetary assembly 30 which directly couples the engine crankshaft 31 to the p.t.o. drive shaft 26 and which provides a dual path drive for the drive shaft 20, one path of this drive including a fluid torque converter 28. The direct coupling between the engine shaft and the p.t.o. drive shaft provides a "live" or constantly rotated p.t.o. and the dual path drive allows a relatively small torque converter to smoothly drive the tractor at high torques and at all speeds.

In the preferred embodiment, the torque converter and planetary assembly 30 includes an annular cup-shaped housing 40 whose open end is bolted directly to a flywheel 39 on the engine crankshaft 31 and which includes a necked down portion 42 that is journaled in an intermediate partitioning wall 32. The wall 32 is preferably formed integrally with the transmission casing 29 and carries a bearing 44 which rotatably supports the housing 40 in coaxial alinement with the engine crank shaft 31.

The output element of the assembly 30 is an output shaft 52 whose one end is piloted in a bearing 56 carried by the flywheel 39 and whose other end extends rearwardly from the housing 40 and through the intermediate partitioning wall 32. The torque converter 28 of the assembly 30 is carried on the output shaft 52 within the housing 40, and a planetary gear assembly 48 is positioned between the converter 28 and the flywheel 39.

For directly coupling the engine shaft 31 to the p.t.o. drive shaft 26, the necked down portion 42 of the annular housing 40 carries a drive gear 45 which is in meshing engagement with a driven gear 46 splined to the p.t.o. drive shaft 26. Since the housing 40 is constantly rotated upon rotation of the engine shaft 31 and its flywheel 39, the p.t.o. drive shaft 26 is thus continuously rotated through the gears 45, 46 whenever the engine is operated.

In describing the dual path drive provided by the assembly 30, it will be assumed that the output shaft 52 is rotatably coupled to the differential drive shaft 20 so that driving the output shaft 52 may be equated to powering the tractor. The clutches and change speed gearing coupling the output shaft 52 to the drive shaft 20 will be described in detail below.

The dual path drive in the assembly 30 is created by the planetary assembly 48 which includes one input element, coupled to the flywheel 39, that drives two output elements, each defining one of the dual paths. In the preferred embodiment, the input element takes the form of a planetary gear 49 journaled on a pin 50 anchored to the flywheel 39 at an intermediate radius. One output element of the gear assembly 48 takes the form of a sun gear 51 which is directly splined to the output shaft 52 and is in meshing engagement with the planet gear 49. The planet gear 49 and sun gear 51 form one path of the dual path drive to the output shaft 52.

The other output element of the gear assembly 48 is a ring gear 54, rotatably mounted on a bearing 55 secured to the flywheel 39, and disposed into meshing engagement with the planet gear 49. The ring gear 54 is flexibly coupled to the torque converter 28 through an annular diaphragm 62 that is bolted to a housing 63 forming a part of the torque converter.

Preferably, the converter 28 is of a well known type including pump elements 66 secured to the housing 63 and turbine elements 68 keyed or splined directly to the output shaft 52. A reaction stator 70 is positioned between the pump and turbine elements 66, 68 and is coupled through a one way clutch 71 to a sleeve 65 which is fitted about the output shaft 52 and anchored to a bracket 72 forming a part of the intermediate wall 32 at the rear end of the housing 40. The second of the dual driving paths provided by the assembly 30 thus includes the planet gear 49, the ring gear 54, the converter housing 63, the pump elements 66 and finally the turbine elements 68 which are coupled to the output shaft 52.

The operation of the dual path drive in the assembly 30 can now be understood. Rotation of the engine shaft 31 and its flywheel 39 drives the planet gear 49 in a circular path about the output shaft 52. This movement of the planet gear 49 must obviously be accompanied by either rotation of the sun gear 51, rotation of the ring gear 54 or rotation of both the sun and ring gears.

When the output shaft 52 is under heavy load, as when the tractor 10 is initially started, the sun gear 51 tends to remain stationary and, hence, driving movement of the planet gear 49 forces rotation of the ring gear 54. This initiates rotation of the torque converter pump element 66 and begins a smooth application of torque through the turbine elements 68 to the output shaft 52. As the output shaft 52 is brought up to speed smoothly by the torque transmitted through the converter 28, the resulting rotation of the sun gear 51 tends to relatively reduce the driven speed of the ring gear 54 and, hence, less power is transferred through the converter and a "direct" drive is established from the flywheel 39 to the sun gear 51 and the output shaft 52.

When the initial high torque requirements have been overcome and the output shaft 52 is brought up to operating speed, the converter 28 tends to "lock-in" so that the pump and turbine elements rotate at the same speed. In this condition, there is little slippage and lost energy in the converter and the planet gear 49, the sun gear 51 and the ring gear 54 rotate in unison with the flywheel 39. It will be appreciated, of course, that at all times, the planet gear 49 drives the output shaft 52 with a couple action, one force vector of the couple acting on the sun gear 51 and an equal and oppositely directed force vector acting on the ring gear 54 to provide the dual power paths. Thus, any sudden load changes on the tractor 10, as when rough terrain has been encountered or an implement is brought into or out of play, the transmission 15 provides a fast torque response with a definite cushioning effect from the torque converter. There is thus a smooth cushioning action as the power of the engine is matched to the torque requirements of the load on the tractor.

As a further important advantage of the dual path drive provided by the assembly 30, the converter 28 can be of relatively small size since it is required to handle only a portion of the total power transmitted by the transmission 15. The converter 28 is thus of a size to fit comfortably within the transmission casing 29 and yet is well able to handle its portion of the load efficiently and with little power loss.

In the preferred construction, the output shaft 52 of the assembly 30 is coupled to the differential drive shaft 20 through a clutch 34 and change speed and reverse gearing 35. The clutch 34 is of the annular fluid disk type and includes a housing 74 journaled by a bearing 79 in a support wall 78 formed integrally with the transmission casing 29. The housing 74 includes a gear portion 76 that is in meshing engagement with a gear 87 carried on a countershaft 90 forming a portion of the gearing 35. The driving element of the clutch 34 is a hub 73 carried within the housing 74 and splined to the output shaft 52. A plurality of interleaved disks 75 are alternately splined to the hub 73 and the housing 74 and are adapted to be pressed into driving engagement by an actuating piston 82. The piston is normally held in disengaged position, at the right of the housing 74 as seen in FIG. 2, by a compressed spring 83. Fluid passages 84 permit the introduction of hydraulic fluid under pressure to the right of the piston 82 so that the disks are frictionally gripped to establish a drive between the hub 73 and the housing 74. This couples the output shaft 52, through the gear portion 76 and the gear 87, to the countershaft 90.

In addition to the countershaft 90, the gearing 35 includes a splined shaft 60 journaled in a bearing 111 that is anchored within an end wall 94 formed integrally with the transmission casing 29. One end of the splined shaft 60 is piloted in a bearing 77 in the end of the clutch housing 74 and receives, in piloted relation, the end of the output shaft 52. The other end of the splined shaft 60 is piloted in bearings 112 in the end of the differential drive shaft 20. The countershaft 90 is journaled parallel to the splined shaft 60 in bearings 91 and 92 mounted, respectively, in the support wall 78 and the end wall 94.

For providing a high speed drive, a shiftable gear 96 is slidably mounted on the splined shaft 60 and adapted to be moved by a fork 100 into meshing engagement with a gear 88 splined on the countershaft 90. To provide a low speed drive, a second shiftable gear 97 is slidably mounted on the splined shaft 60 and adapted to come into meshing engagement with a gear 89 splined to the countershaft 90. The position of the gear 97 is controlled by a fork 101.

For establishing a reverse drive, a sleeve 106 is journaled parallel to the countershaft 90 and provided with a gear portion 107 in meshing engagement with the gear 89 on the countershaft. The sleeve 106 also carries a gear 105 adapted to receive in meshing engagement the gear 97 when it is shifted to the left in FIG. 2.

Operation of the change speed and reverse gearing 35 will be well understood by those skilled in the art. The forks 100, 101 are controlled by shifter levers in the usual manner.

Preferably, high and low driving ranges are provided by a planetary gear assembly 110 mounted to the left of the end wall 94 of the transmission casing 29. The assembly 110 includes a ring gear 116 fixed to the wall 94 coaxially about a sun gear 115 splined on the end of the shaft 60. A plurality of planet gears 113 are journaled on a planet carrier 114 in meshing engagement with both the sun gear 115 and the ring gear 116. A jaw clutch element 118 provided with teeth 130 is slidably splined on the end of the differential drive shaft 20 and is coupled to a fork 120 carried by a shifter rod 122. The position of the shifter rod is controlled by a shifter lever 99. Rotation of the lever 99 in a counterclockwise direction slides the clutch element 118 to the right in FIG. 2 so that its splines span the shafts 20 and 60 to establish a direct drive from the shaft 60 to the differential drive shaft 20. Rotation of the lever 99 in a clockwise direction pulls the clutch element 118 to the left in FIG. 2 and causes the jaw teeth 130 to come into meshing engagement with a plurality of teeth 117 formed on the planetary carrier 114. This establishes a reduced speed drive from the splined shaft 60 through the planet gears 113 to the drive shaft 20.

It can now be seen that the transmission 15 is particularly compact and hence well suited for use in agricultural tractors. The assembly 30 fits easily within the space between the flywheel 39 and the intermediate partitioning wall 32 of the transmission casing 29. The wall 32 provides a solid bearing support for anchoring the housing 40 in proper relationship to the engine drive shaft 31.

The clutch 34 is snugly sandwiched between the change speed and reverse gearing 35 and the partitioning wall 32 so that the clutch and gearing occupy the same space normally taken up by the change speed gearing of a tractor transmission.

Virtually all of the individual components of the transmission 15, including the torque converter 28 and the fluid clutch 34, are of standard highly developed types so that the transmission may be easily serviced and is capable of operating efficiently through a long trouble-free service life. The advantages of the dual path drive and the achievement of a "live" p.t.o. despite the incorporation of a torque converter drive have been set forth in some detail above.

We claim as our invention:

1. In a power transmission unit for rotating a drive shaft and a p.t.o. shaft from a power source, the combination comprising, a flywheel rotated by the power source, an annular housing mounted coaxially on said flywheel, said drive shaft being piloted in said flywheel and extending from said housing, a converter having a pump and a turbine rotatably carried on said drive shaft within said housing, a planetary gear assembly including a planet carrier and planet gears, a sun gear and a ring gear positioned between said converter and said flywheel, said flywheel being rotatably coupled to said planet carrier of said gear assembly, said sun gear being rotatably coupled to said drive shaft and said ring gear being rotatably coupled to said converter pump, said converter turbine being keyed for rotation with said drive shaft whereby dual power paths are provided for said drive shaft with one path including said converter so as to smoothly power said drive shaft, and said housing being geared directly to said p.t.o. shaft so as to provide a constant positive drive to said p.t.o. shaft.

2. In a tractor power transmission unit for driving a differential and a p.t.o. shaft from a power source, the combination comprising a flywheel rotated by the power source, an annular housing mounted coaxially on said flywheel, a drive shaft piloted in said flywheel and extending from said housing, a converter having a pump and a turbine rotatably carried on said drive shaft within said housing, a planetary gear assembly including an input element and two output elements positioned between said converter and said flywheel, said flywheel being rotatably coupled to said input element of said gear assembly, one of said output elements of said gear assembly being rotatably coupled to said drive shaft and the other of said output elements being rotatably coupled to said converter pump, said converter turbine being rotatably coupled to said drive shaft, said housing being geared directly to said p.t.o. shaft, shiftable gears rotatably coupling said drive shaft and said differential so as to provide a choice of speeds and direction of rotation of the differential, and a fluid clutch on said drive shaft between said annular housing and said shiftable gears of releasing the drive to said gears.

3. In a tractor power transmission unit for driving a differential and a p.t.o. shaft from a power source enclosed within a transmission casing, the combination comprising, a flywheel rotated by the power source at one end of said casing, an intermediate wall partitioning the casing between said flywheel and said differential, an annular housing mounted coaxially on said flywheel and being journaled in said wall, a drive shaft piloted in said flywheel and rotatably extending from said housing and through said wall, a converter having a pump and a turbine rotatably carried on said drive shaft within said housing, a planetary gear assembly including an input element and two output elements positioned between said converter and said flywheel, said flywheel being rotatably coupled to said input element of said gear assembly, one of said output elements of said gear assembly being rotatably coupled to said drive shaft and the other of said output elements being rotatably coupled to said converter pump, said converter turbine being rotatably coupled to said drive shaft, said housing being geared directly to said p.t.o. shaft, shiftable gears on the side of said wall opposite said housing and being interposed between the extending portion of said drive shaft and said differential for providing a choice of speeds and direction of rotation of the differential, and a selectively operable fluid clutch on said drive shaft sandwiched between said wall and said shiftable gears for releasing the drive to said gears.

References Cited in the file of this patent

UNITED STATES PATENTS

| | | |
|---|---|---|
| 2,736,215 | Swift | Feb. 28, 1956 |
| 2,769,303 | Lucis et al. | Nov. 6, 1956 |
| 2,850,921 | Knowles | Sept. 9, 1958 |
| 2,943,515 | Issacson et al. | July 5, 1960 |
| 2,951,398 | Glomb et al. | Sept. 6, 1960 |

FOREIGN PATENTS

| | | |
|---|---|---|
| 805,729 | France | Aug. 31, 1936 |
| 1,117,081 | France | Mar. 16, 1956 |